(12) United States Patent
Metcalfe et al.

(10) Patent No.: US 8,331,732 B2
(45) Date of Patent: Dec. 11, 2012

(54) BINARY REDUCTION WITH STRUCTURE PRESERVATION AND DENSITY CONTROL

(75) Inventors: Ryan Metcalfe, Marion, NY (US); Clara Cuciurean-Zapan, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 377 days.

(21) Appl. No.: 12/835,239

(22) Filed: Jul. 13, 2010

(65) Prior Publication Data

US 2012/0014620 A1 Jan. 19, 2012

(51) Int. Cl.
*G06K 9/32* (2006.01)

(52) U.S. Cl. ....... 382/299; 382/274; 382/275; 358/3.26; 358/3.27

(58) Field of Classification Search .................. 382/274, 382/275, 282, 299; 358/3.26, 3.27, 463
See application file for complete search history.

(56) References Cited

U.S. PATENT DOCUMENTS

| | | | |
|---|---|---|---|
| 5,655,061 A | 8/1997 | Tse et al. | |
| 5,805,304 A | 9/1998 | Sekine | |
| 6,363,177 B1 | 3/2002 | Loce et al. | |
| 6,424,751 B2 | 7/2002 | Carney et al. | |
| 6,717,770 B1 | 4/2004 | Crawford | |
| 6,999,619 B2 * | 2/2006 | Toda | 382/172 |
| 7,362,885 B2 * | 4/2008 | Hammoud | 382/117 |
| 7,376,267 B2 * | 5/2008 | Toda | 382/166 |
| 7,627,191 B2 | 12/2009 | Xu et al. | |
| 7,940,632 B2 * | 5/2011 | Miyauchi et al. | 369/272.1 |
| 7,940,961 B2 * | 5/2011 | Allen | 382/103 |

* cited by examiner

*Primary Examiner* — Yosef Kassa
(74) *Attorney, Agent, or Firm* — Pillsbury Winthrop Shaw Pittman, LLP

(57) ABSTRACT

A method for performing binary image reduction on binary image data includes receiving binary input image data; determining a conversion factor to scale (i) an input resolution to an output resolution and/or (ii) an input size to an output size; applying the conversion factor to the input image data to obtain intermediate data, where each intermediate data corresponds to at least one input pixel and at least a portion of another input pixel; obtaining a binary output image data comprising a plurality of output pixels by thresholding the corresponding intermediate data; determining an error value for each output pixel, the error value is a non-integer value obtained as a result of thresholding the intermediate data corresponding to the output pixel; and propagating the obtained error value to an adjacent output pixel in a scanline, where the output image data is scaled to the output resolution and/or the output size.

18 Claims, 9 Drawing Sheets

NOTE: QUALITY OF IMAGE IS LOW (ACTUAL IMAGE)

NOTE: QUALITY OF IMAGE IS LOW (ACTUAL IMAGE)

NOTE: QUALITY OF IMAGE IS LOW (ACTUAL IMAGE)

NOTE: QUALITY OF IMAGE IS LOW (ACTUAL IMAGE)

NOTE: QUALITY OF IMAGE IS LOW (ACTUAL IMAGE)

NOTE: QUALITY OF IMAGE IS LOW (ACTUAL IMAGE)

NOTE: QUALITY OF IMAGE IS LOW (ACTUAL IMAGE)

NOTE: QUALITY OF IMAGE IS LOW (ACTUAL IMAGE)

NOTE: QUALITY OF IMAGE IS LOW (ACTUAL IMAGE)

NOTE: QUALITY OF IMAGE IS LOW (ACTUAL IMAGE)

NOTE: QUALITY OF IMAGE IS LOW (ACTUAL IMAGE)

NOTE: QUALITY OF IMAGE IS LOW (ACTUAL IMAGE)

BINARY REDUCTION WITH STRUCTURE PRESERVATION AND DENSITY CONTROL

BACKGROUND

1. Field

The present disclosure relates to a method and a system for performing binary image reduction on binary image data.

2. Description of Related Art

Image data comprises a number of pixels. Each pixel corresponds to a defined location in the image. Image data includes various color or gray levels, which contribute to the intensity of each pixel in the image. Each pixel of the image is assigned a number representing the amount of light or gray level for that space at that particular spot; i.e., the shade of gray in the pixel. Binary image data has two possible values for each pixel, black (e.g., represented by the number "1") or white (e.g., represented by the number "0"). Images that have a large range of shades of grays are referred to as grayscale images. For example, an 8-bit value comprises 256 values or shades of gray for each pixel in the image. Grayscale image data may also be referred to as continuous tone images or contone images.

When image data is provided by a device, such as a scanner, it is provided in a specific size and/or resolution (e.g., 600×600 dots per square inch (dpi)). The image data often goes through a scaling process to change the size of the image—i.e., by changing the number of pixels of image data. Image data may be scaled up—increasing the size of the image data—or scaled down—reducing the size of the image data. Scaling (up or down) is performed for various purposes, such as: reducing the amount of data, decreasing the output file size, converting the resolution to match the requirements for output resolution, etc. For example, to send an image to an image output terminal (IOT) (e.g., a solid ink printing device) of a multifunction product (MFP), it may be desirable or required to rotate the image (e.g., because of the paper orientation or finisher). In order to print image data with dimensions specific to a printing device, the input image data must then be scaled to the output resolution (e.g., dots per square inch (dpi)) or output size to match the number of pixels (or dots) that will be distributed in each section of the paper. For example, an input image may be scanned at a resolution of 600×600 dpi, processed using a number of middle function operations, and then rotated and scaled down from 600×600 dpi to 467×375 dpi for output to a printing device. The scaling and/or resolution conversion operation(s) should be done without sacrificing image quality significantly.

In order to maintain image quality, some known methods for scaling (up or down) image data accomplish resolution conversion and/or reduction by storing and processing grayscale image data. That is, input binary image data is converted to grayscale image data for further processing (e.g., operations such as using a scaling factor on the pixels of image data). Because a large memory is required for storing scanned grayscale data, the above method of processing such can be costly.

If the binary image data is scaled using know scaling methods, then the resulting image may appear grainier than desirable and may also contain other aliasing artifacts or moiré patterns. This appears especially true in images of relatively small amounts of image data that require a small amount of scaling, such as scaling the image data from 600×600 dpi to 450×567 dpi. Thus, the output image quality is lowered. This problem becomes more difficult, for example, when dealing with marking engines that utilize asymmetric resolutions and the image data is binary. With asymmetric resolutions, such as 450×567 dpi, one cannot decide on the paper tray (long-edge feed or short-edge feed) after scanning the image into memory. This feature is often referred to as "late binding" of a paper tray, which is quite useful feature in MFPs. In order to accomplish "late binding" (a very desirable user feature) it is necessary to bring the image in a format that matches the final output size and/or resolution. Thus, the system requires a quality approach to scaling binary image data that is stored in the memory. Alternatively, in order to prevent the loss of quality in the image data that is output to MFPs, one method, for example, disables the late binding of paper tray. However, disabling the late binding of the paper tray is inconvenient for a user.

Some methods accomplish image data scaling by converting the binary image data (1 bit per pixel) to grayscale or contone image data (8 bits per pixel) before scaling. Averaging or linear interpolation scaling algorithms may then be applied to the grayscale or contone image data. In order to convert the image data back to binary, the resulting data may be error diffused, for example. U.S. Pat. Nos. 5,805,304, 6,363,177 and 6,717,770 provide examples of such methods, and are hereby incorporated by reference in their entirety. However, conversion from binary to pseudo gray by remapping may produce a grainy output, and scaling grayscale or contone image data tends to be expensive. Therefore, a binary scaling method that provides a good image quality is needed.

SUMMARY

According to one aspect of the present disclosure, a computer-implemented method for performing binary image reduction on binary image data is provided. The method is implemented in a computer system comprising one or more processors configured to execute one or more computer program modules. The method includes receiving binary input image data; determining a conversion factor to scale (i) an input resolution to an output resolution, (ii) an input size to an output size or (iii) the input resolution to the output resolution and the input size to the output size; applying the conversion factor to the input image data to obtain intermediate data; obtaining a binary output image data by thresholding the corresponding intermediate data; determining an error value for each output pixel; and propagating the obtained error value to an adjacent output pixel in a scanline, where the output image data is scaled to the output resolution and/or the output size. The input image data includes the input resolution, the input size and a plurality of input pixels. Each intermediate data corresponds to at least one input pixel and at least a portion of another input pixel. The binary output image data includes a plurality of output pixels. The error value is a non-integer value obtained as a result of thresholding the intermediate data corresponding to the output pixel.

According to another aspect of the present disclosure, a system for performing binary image reduction on binary image data is provided. The system includes an input device, a processor, and an output device. The input device is configured to receive binary input image data. The input image data includes an input resolution, an input size, and a plurality of input pixels. The processor is configured to: a) determine a conversion factor to scale (i) an input resolution to an output resolution, (ii) an input size to an output size or (iii) the input resolution to the output resolution and the input size to the output size; b) apply the conversion factor to the input image data to obtain intermediate data; c) obtain a binary output image data comprising a plurality of output pixels by thresholding the corresponding intermediate data; d) determine an error value for each output pixel; and e) propagate the obtained error value to an adjacent output pixel in a scanline. Each intermediate data corresponds to at least one input pixel and at least a portion of another input pixel. The error value is a non-integer value obtained as a result of thresholding the intermediate data corresponding to the output pixel. The output device is configured to output the binary output image data scaled to the output resolution and/or the output size.

Other objects, features, and advantages of one or more embodiments of the present disclosure will seem apparent from the following detailed description, and accompanying drawings, and the appended claims.

BRIEF DESCRIPTION OF THE DRAWINGS

Various embodiments will now be disclosed, by way of example only, with reference to the accompanying schematic drawings in which corresponding reference symbols indicate corresponding parts, in which

FIGS. 13-17 illustrate how density of the output image data may be adjusted by varying certain parameters.

DETAILED DESCRIPTION

Figure 1:
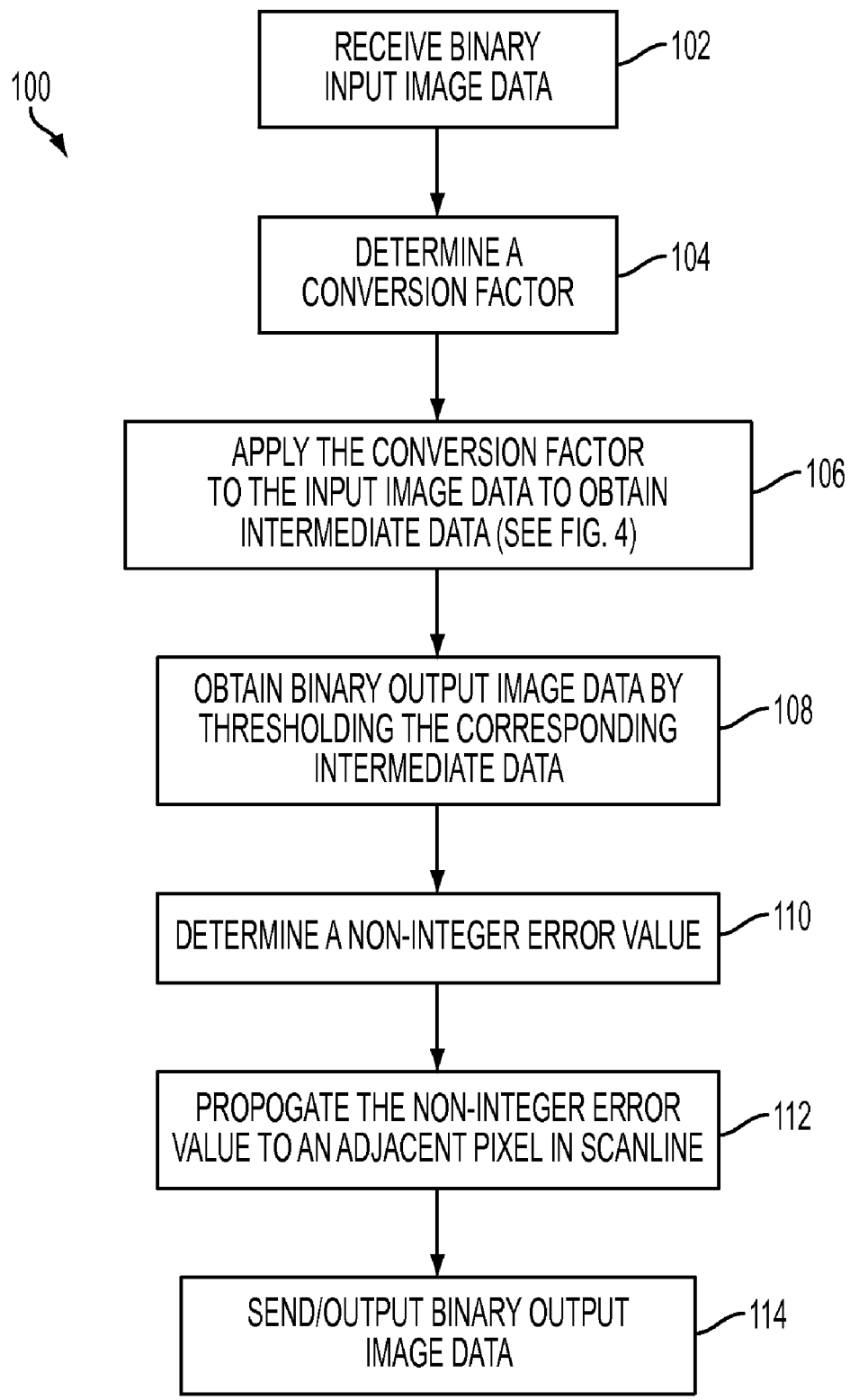
FIG. 1 illustrates a method for performing binary image reduction on binary image data in accordance with an embodiment of the present disclosure.
Figure 2:
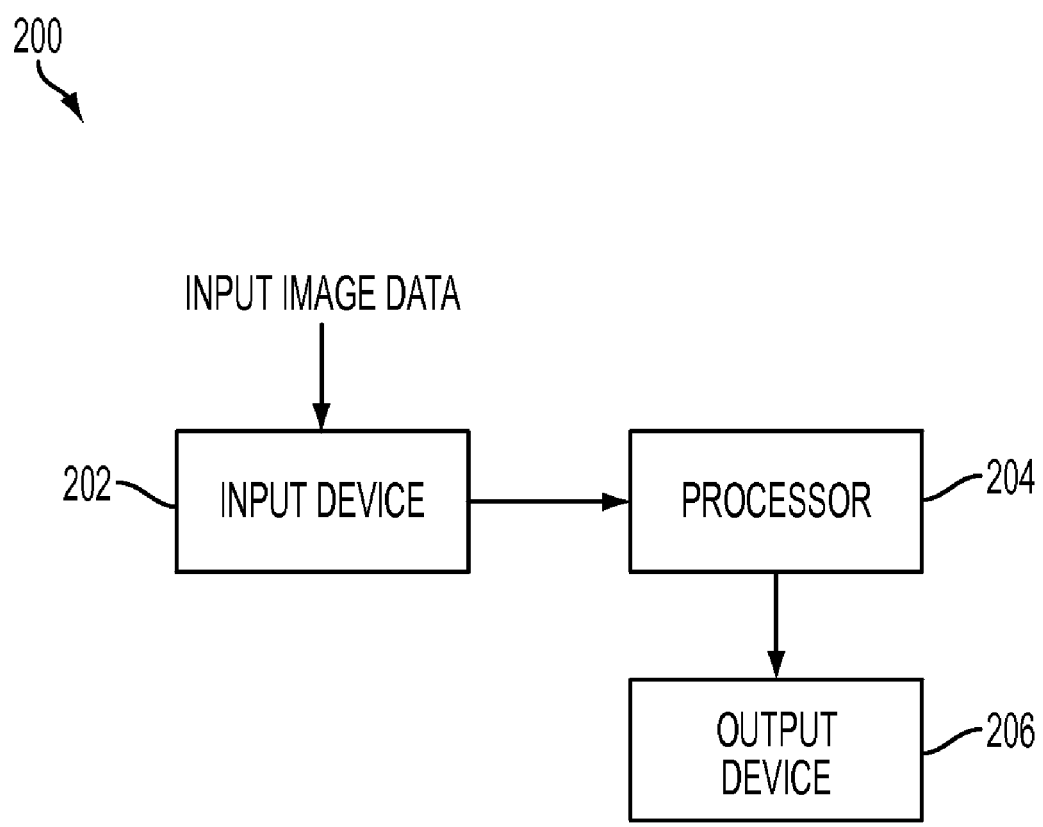
FIG. 2 illustrates a system for performing binary image reduction on binary image data in accordance with an embodiment of the present disclosure.

A method 100 and a system 200 for binary image reduction (scaling) are shown in FIGS. 1 and 2, respectively. According to the method 100, in order to generate an output pixel, whole and fractional input pixels in an input image over the area corresponding to the output pixel are weighted (or summed) to create intermediate data. The intermediate data is then thresholded to produce the output data (i.e., having output pixels) with an error being propagated to the next pixel. A level of precision is obtained by performing the thresholding operation on the non-integer intermediate data to obtain the non-integer error value, which is propagated to the adjacent output pixel in the scanline. In the method 100, a rendered binary (i.e., 1 bit per pixel (bpp)) input image is used to obtain a binary (i.e., 1 bpp) output image, which is scaled to a desired output resolution or output size.

A threshold value (i.e., used during the thresholding operation) and one or more factors (i.e., density parameter and error amortization factor used during the error propagation) used in the method 100 are made programmable for potential density adjustment of the output image. The method 100 proposes a one direction (e.g., a fast-scan/cross-process direction) image reduction operation. A two-dimensional image reduction (i.e., image reduction in both the fast-scan/cross-process direction and a slow-scan/process direction) may be achieved by performing two one-dimensional image reductions with a 90 degree rotation of the image in between (i.e., the two one-dimensional image reductions). In other words, if scaling in both the fast scan direction and slow scan direction is desired, the image is first scaled in the fast scan direction using the method 100, the image is then rotated 90 degrees, and the rotated image is scaled in the slow scan direction using the method 100.

The method 100 and the system 200 provide a software binary scaling with a good image quality. The method 100 and the system 200 preserve the dot structure pattern (i.e., obtained from a previous rendering operation) as well as small text and line art in the output image. The method 100 and the system 200 may be used in low cost products in which a conversion between input image resolution and marking resolution is needed. In other words, the method 100 and the system 200 is useful in low cost and/or multifunction devices where the image path is binary (1 bpp) and there is no possibility of rendering further down the line (e.g., in an image marking engine (IME) or in the IOT) due to cost and/or image path constraints. The method 100 and system 200, thus, provides a cost-effective way of performing binary scaling or resolution conversion.

FIG. 1 provides the method 100 for performing binary image reduction on binary image data. The method 100 is a computer-implemented method that is implemented in a computer system comprising one or more processors 204 (as shown in and explained with respect to FIG. 2) configured to execute one or more computer program modules.

The method 100 begins at procedure 102, where binary input image data is received by an input device 202 (as shown in and explained with respect to FIG. 2). The input image data includes an input resolution, an input size, and a plurality of input pixels.

The method 100 then proceeds to procedure 104. At procedure 104, a conversion factor to scale the input resolution to an output resolution, or to scale the input size to an output size, or to scale the input resolution to the output resolution and the input size to the output size is determined by the processor 204. The input resolution is the resolution of the binary input image data and the output resolution is the resolution to which the binary output image data is scaled to. The input size is the size of the binary input image data and the output size is the size to which the binary output image data is scaled to. In one embodiment, the conversion factor is a ratio of the input resolution of the input image to the output resolution of the output image (i.e., the ratio of output of the Equation (2) to output of Equation (3), where the Equations (2) and (3) are described in detail in the discussions below). In another embodiment, the conversion factor is a ratio of the input size of the input image to the output size of the output image. In yet another embodiment, the conversion factor is calculated using a ratio of the input size of the input image to the output size of the output image and a ratio of the input resolution of the input image to the output resolution of the output image.

The method 100 then proceeds to procedure 106. At procedure 106, the conversion factor (i.e., determined at procedure 104) is applied to the input image data to obtain intermediate data. Each intermediate data corresponds to at least one input pixel and at least a portion of another input pixel.

Figure 4:
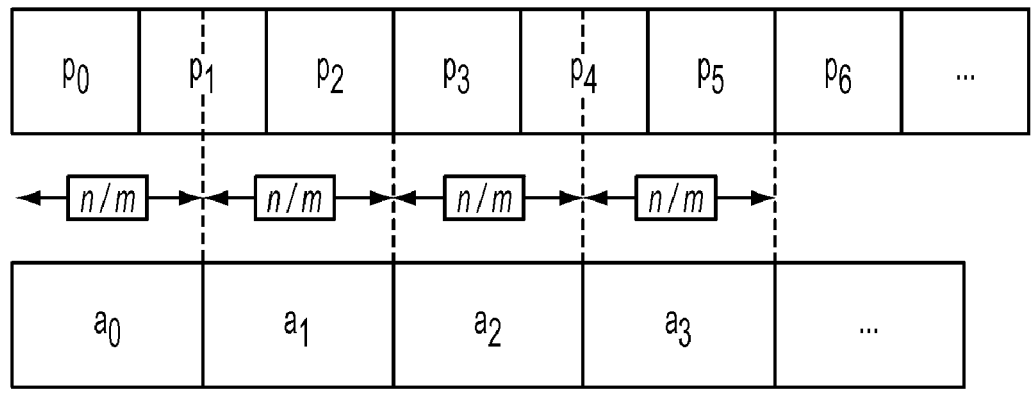
FIG. 4 illustrates an exemplary representation of the input pixels of the binary input image data and corresponding intermediate data, where each intermediate data corresponds to at least one input pixel and at least a portion of another input pixel in accordance with an embodiment of the present disclosure.

FIG. 4 illustrates an exemplary representation of the input pixels of the binary input image data and the corresponding intermediate data. In FIG. 4, $p_0, p_1, p_2, p_3, p_4, \ldots, p_{ti}$ represent the input pixels, and $a_0, a_1, a_2, a_3, a_4, \ldots, a_{to}$ represent the intermediate data, respectively. As shown in FIG. 4, each intermediate data (e.g., $a_0$) corresponds to at least one input pixel (e.g., $p_0$) and at least a portion of another input pixel (e.g., $p_1$). The procedure 106 may generally be characterized by the following code section:

```
while(areaLeft ≧ 1)
{
    a_i = a_i + p_{p_index}
    p_index = p_index + 1
    areaLeft = areaLeft − 1
}
if( areaLeft > 0)
{
    a_i = a_i + (p_{p_index} * areaLeft)
    a_{i+1} = p_{p_index} * (1 − areaLeft)
    areaLeft = n/m − (1 − areaLeft)
    i = i + 1
    p_index = p_index + 1
}
else
{
    areaLeft = n/m
}
```

In the above code section, the variable "areaLeft" is initialized to n/m at the start of every scanline (the values of n and m are obtained using Equations (2) and (3), respectively, which are described in detail in the discussions below), the variable "i" is initialized to 0 at the start of every scanline, the variable "$a_i$" is initialized to 0 for each i, and the variable "p_index" is initialized to 0 at the start of every scanline. The variable "p_index" generally represents the current input pixel and the variable "i" generally represents the current intermediate data and the current output pixel.

Figure 3:
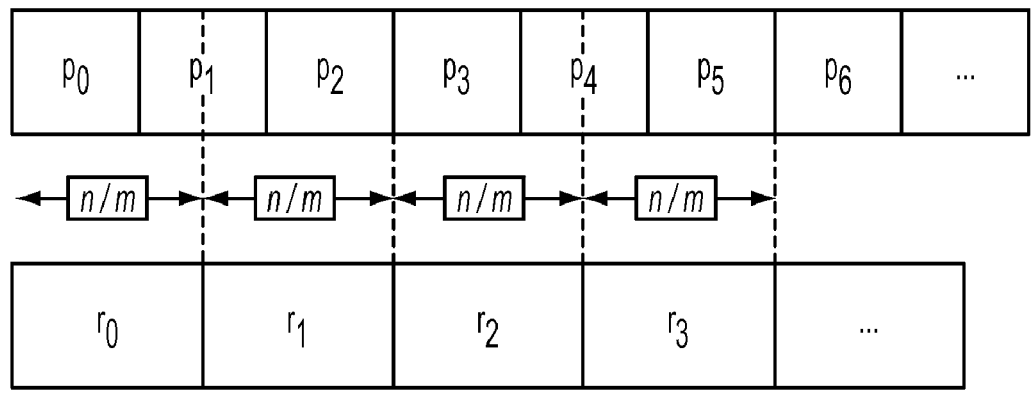
FIG. 3 illustrates an exemplary representation of input pixels of binary input image data and corresponding output pixels of binary output image data in accordance with an embodiment of the present disclosure.

The control of the above code section leaves the above while loop when the variable "areaLeft" is or some fraction less than 1. If the variable "areaLeft" is less than 1 and greater than 0, then the code section under if of the if-else loop is executed. The code section under else of the if-else loop is executed, for example, when boundary of intermediate data or output pixel coincides with the boundary of the input pixel. As shown in FIG. 3, boundary of intermediate data, $a_3$ and the output pixel, $r_3$ coincides with the boundary of input pixel, $p_5$. In such a situation, the variable "areaLeft" is re-initialized to n/m, which is shown under else of the if-else loop.

After the intermediate data is obtained, the method 100 then proceeds to procedure 108. At procedure 108, a binary output image data having a plurality of output pixels is obtained by thresholding the corresponding intermediate data.

The number of output pixels that are output for a given number of input pixels is obtained using Equation (1):

$$to = \left[\left(\frac{inRes}{outRes}\right) \times ti\right] \quad \text{Equation (1)}$$

where to=total output pixels;
ti=total input pixels;
inRes=input resolution;
outRes=output resolution; and $$\left[\left(\frac{inRes}{outRes}\right) \times ti\right] = \text{floor}\left(\left[\left(\frac{inRes}{outRes}\right) \times ti\right]\right).$$

In general, the floor function maps a real number to the largest previous integer. That is, floor(x)=[x] is the largest integer not greater than x. The floor function is also generally referred to as greatest integer function, and its value at x the integer part of x. For example, if x=5.4, then floor(5.4)=5; and if x=−5.3, then floor(−5.3)=−6.

FIG. 3 illustrates an exemplary representation of the input pixels of the binary input image data and the output pixels of the binary output image data. In FIG. 3, $p_0, p_1, p_2, p_3, p_4, \ldots, p_{ti}$ represent the input pixels, and $r_0, r_1, r_2, r_3, r_4, \ldots, r_{to}$ represent the output pixels, respectively. As shown in FIG. 3, one output pixel is output for every n/m input pixels where n and m are obtained from Equations (2) and (3), respectively.

$$n = \frac{inRes}{gcd(inRes, outRes)} \quad \text{Equation (2)}$$

where inRes=input resolution;
outRes=output resolution; and
gcd(in Re s, out Re s) is greatest common divisor of inRes and outRes.

$$m = \frac{outRes}{gcd(inRes, outRes)} \quad \text{Equation (3)}$$

where in Res=input resolution;
outRes=output resolution; and
gcd(in Re s, out Re s) is greatest common divisor of in Res and outRes.

In general, the greatest common divisor (gcd) (or the greatest common denominator, or the greatest common factor (gcf), or the highest common factor (hcf)) of two or more non-zero integers is the largest positive integer that divides the two or more non-zero integers without a remainder.

For example, if the input resolution of the binary input image data, in Res is 400 dpi and the output resolution of the binary output image data, outRes is 225 dpi, then the values of n and m calculated using Equations (2) and (3) are 16 and 9, respectively. In such an embodiment, when the input resolution of the binary input image data, in Res is 400 dpi and the output resolution of the binary output image data, outRes is 225 dpi, one output pixel is output for every 16/9 input pixels.

Referring back to FIG. 1, at procedure 108, the processor 204 performs thresholding of the intermediate data. That is, the processor 204 determines whether a value of the current intermediate data exceeds a threshold value, and assigns either a value of 1 or 0 to the corresponding output pixel in the output image data based on whether the value of the current intermediate data exceeds the threshold value. If the value of the current intermediate data is greater than the threshold value, then the output pixel is assigned a value of "1" (e.g., "dark"). If the value of the current intermediate data is less than the threshold value, then the output pixel is assigned a value of "0" (e.g., "light" or "white").

The threshold value, thresh is a predetermined value. In one embodiment, the threshold value, thresh ranges from 0.3 to 0.95. As shown in and explained in detail with respect to FIGS. 13-17, the threshold value, thresh may be adjusted (i.e., made programmable) for potential density adjustment of the output image.

The output pixel is obtained by thresholding the corresponding intermediate data as shown in Equation (4):

$$r_i = \begin{cases} 1 & \text{if } a_i > thresh \\ 0 & \text{otherwise} \end{cases} \quad \text{Equation (4)}$$

where $r_i$=output pixel;

$a_i$=intermediate data; and thresh=threshold value.

The method 100 then proceeds from the procedure 108 to procedure 110. At procedure 110, an error value for each output pixel is determined by the processor 204. The error value is a non-integer value obtained as a result of thresholding the intermediate data corresponding to the output pixel. The difference between the value of the current intermediate data and the value of the corresponding output pixel is the error value for that output pixel. The method 100 preserves the error of the thresholding operation that is later propagated to the adjacent pixel in the scanline. The error value for each output pixel is determined using Equation (5):

$$errbuf = (a_i - r_i \times dfactor)/eafactor \quad \text{Equation (5)}$$

where $r_i$=output pixel;

$a_i$=intermediate data;

dfactor=a density parameter;

eafactor=an error amortization factor; and errbuf=the error value.

The error value that is calculated using the Equation (5) is assigned to an adjacent output pixel in the scanline. That is, at procedure 112, the error value obtained at procedure 110 is propagated to an adjacent output pixel in the scanline. This is done by adding the error value to the adjacent intermediate data before thresholding the adjacent intermediate data. The propagation of the error value to an adjacent intermediate data is shown in Equation (6):

$$a_i = a_i + errbuf \quad \text{Equation (6)}$$

where $a_i$=adjacent intermediate data; and errbuf=the error value.

The procedures 108, 110 and 112 may generally be characterized by the following code section:

$$a_i = a_i + errbuf$$

$$r_i = \begin{cases} 1 & \text{if } a_i > thresh \\ 0 & \text{otherwise} \end{cases}$$

$$errbuf = (a_i - r_i \times dfactor)/eafactor$$

In the above code section, the variable "errbuf" is initialized to 0 at the start of every scanline, and the variable "i" is initialized to 0 at the start of every scanline. The variable "errbuf" generally represents the non-integer error value associated with each output pixel, the variable "i" generally represents the current intermediate data and output pixel, the variable "thresh" generally represents the threshold value, the variable "dfactor" generally represents the density parameter, and the variable "eafactor" generally represents the error amortization factor.

The density parameter, dfactor and the error amortization factor, eafactor are configured to generally control the amount of error that is propagated to the adjacent pixels, and thereby adjust the density of the output image.

The error amortization factor, eafactor is a parameter that controls the amount of error that can be accumulated in the error value, errbuf (i.e., eafactor makes sure that not too much error is accumulated into the error value, errbuf), or limits the amount of error that is propagated to the adjacent pixel.

The density parameter, dfactor is a parameter that controls the amount of error that can be propagated to the adjacent pixel. For example, density parameter, dfactor is adjusted (i.e., increased or decreased) to control the amount of error that can be propagated to the adjacent pixel. This adjustment (increase or decrease) of the density parameter, dfactor in turn makes the output image denser or less dense, respectively.

The density parameter, dfactor and the error amortization factor, eafactor are predetermined values. As shown in and explained in detail with respect to FIGS. 13-17, the density parameter, dfactor and the error amortization factor, eafactor may be adjusted (i.e., made programmable) for potential density adjustment of the output image. In one embodiment, the density parameter, dfactor ranges from 1 to 2.5 and the error amortization factor, eafactor ranges from 0.5 to 4.0.

The process of obtaining intermediate data, thresholding the intermediate data to obtain the output pixel, determining the error value for the output pixel, and propagating the error value to an adjacent pixel iterates over each subsequent pixel until all pixels in the image are computed.

The method 100 ends at procedure 114, where the binary output image data is sent/output to an output device 206 (as shown in and explained with respect to FIG. 2).

In one embodiment, the procedures 102-114 can be performed by one or more computer program modules that can be executed by one or more processors 204 (as shown in and explained with respect to FIG. 2).

FIG. 2 provides the system 200 for performing binary image reduction on binary image data. The system 200 includes the input device 202, the processor 204, and the output device 206.

The image input device 202 is configured to receive binary input image data, where the input image data includes an input resolution, an input size, and a plurality of input pixels. The image input device 202 is configured to receive the binary input image data by any means of data communication. In one embodiment, the input image data may be transferred to the image input device 202 via a computer network, telecommunications network, computer medium, such as, for example, magnetic disk, optical disk, magnetic tape or solid state memory device. Additionally, if the processor 204 includes authoring tools, the image input device 202 is configured to receive the input image data directly from the authoring tools or computer memory associated therewith. For example, the image input device 202 is configured to receive the binary input image data from a word processor, slide presentation tool, desktop publishing software, or a scan and make ready tool. The image input device 202 is configured to receive the input image data from a scanner or digital camera that is used to image or digitize an image of an item or document of interest.

In one embodiment, the processor 204 can comprise either one or a plurality of processors therein. Thus, the term "processor" as used herein broadly refers to a single processor or multiple processors. In one embodiment, the processor 204 can be a part of or forming a computer system. In one embodiment, the processor 204 can be a part of the input device 202.

The processor 204 is configured to: a) receive the input image data from the input device 202; b) determine the conversion factor to scale the input resolution to the output resolution, to scale the input size to the output size, or to scale the input size to the output size and the input resolution to the output resolution; c) apply the conversion factor to the input image data to obtain the intermediate data; d) obtain the binary output image data comprising a plurality of output pixels by thresholding the corresponding intermediate data; e) determine an error value for each output pixel; and f) propagate the obtained error value to the adjacent output pixel in the scanline. As noted above, each intermediate data corresponds to at least one input pixel and at least a portion of another input pixel. The error value is a non-integer value obtained as a result of thresholding the intermediate data corresponding to the output pixel.

The image output device 206 is configured to output the binary output image data scaled to the output resolution and/or the output size. The image output device 206 may be a printing device or print engine, facsimile transmission device, display device or other device for providing visual representations of images. Alternatively, the manipulated image output data may be stored in a computer memory or computer media or transmitted to another device over a communications or computer network.

In the present disclosure, the process (or slow scan) direction is the direction in which an image bearing surface (e.g., photoreceptor belt or drum) moves and the cross-process (or fast scan) direction is generally perpendicular to the process (or slow scan) direction.

Figure 5:
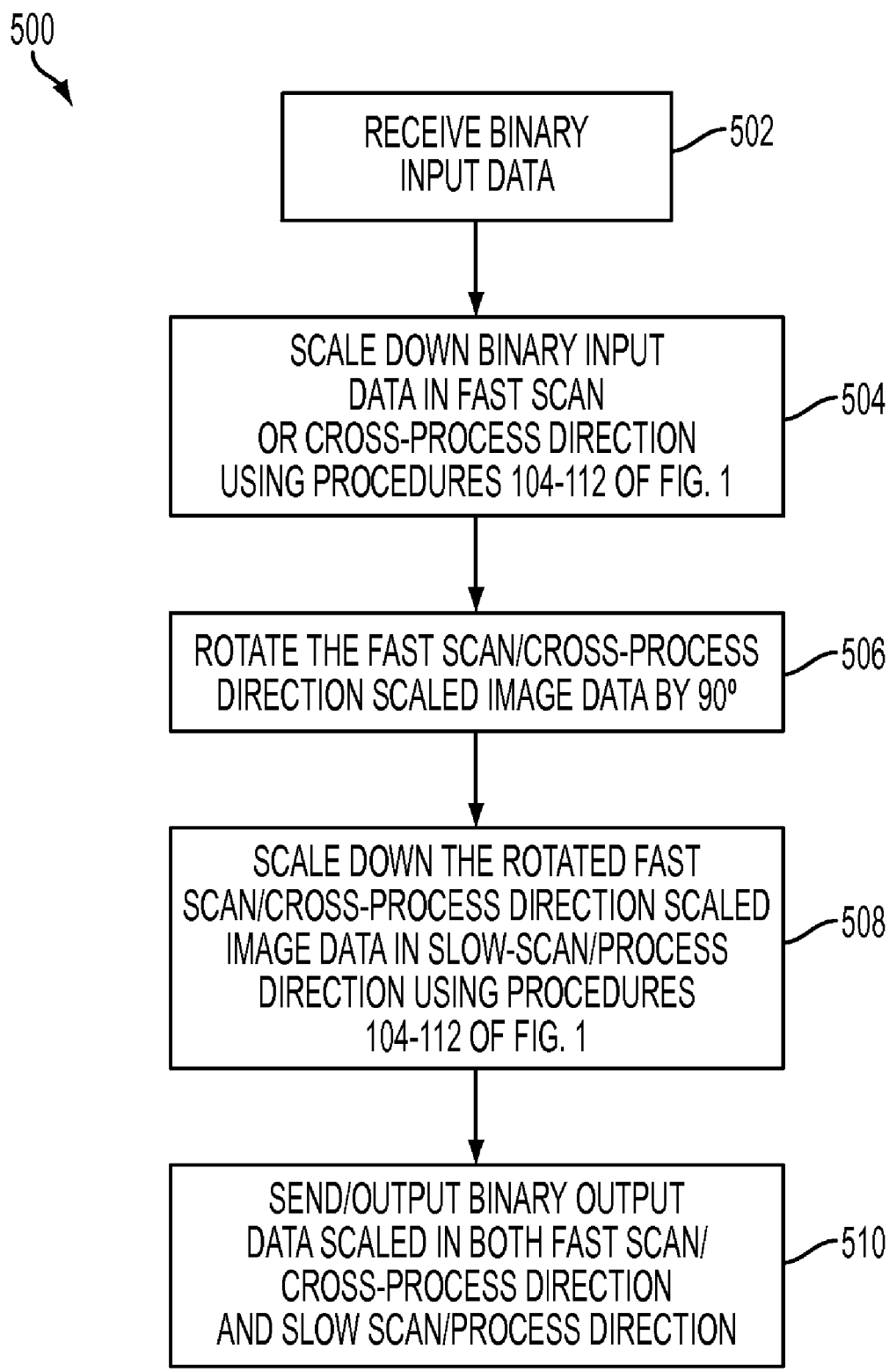
FIG. 5 illustrates a method for performing binary image reduction on binary image data both in cross process direction and process direction in accordance with an embodiment of the present disclosure.

FIG. 5 illustrates a method for performing binary image reduction on binary image data both in the cross process direction and the process direction in accordance with an embodiment of the present disclosure.

The method 500 begins at procedure 502, where binary input image data is received by the input device 202 (as shown in and explained with respect to FIG. 2). The input image data includes an input resolution, an input size, and a plurality of input pixels.

The method 500 then proceeds to procedure 504. At procedure 504, the processor 204 is configured to perform binary image reduction on the binary input image data using the procedures 104-112 of the method 100 described in FIG. 1. The binary image reduction that is performed on the input image data at procedure 504 produces a scaled image data having a predetermined (a higher or a lower) resolution and/or size in the fast-scan or the cross-process direction. The resolution and size of the scaled image data (i.e., obtained at procedure 504) in the slow-scan or the process direction remains the unchanged during the procedure 504.

The method 500 then proceeds to procedure 506. At procedure 506, the processor 204 is configured to rotate the scaled image data (i.e., obtained at procedure 504) by 90°.

The method 500 then proceeds to procedure 508. At procedure 508, the processor 204 is configured to perform binary image reduction on the rotated, scaled image data (obtained at procedure 506) using the procedures 104-112 of the method 100 described in FIG. 1. The binary image reduction that is performed on the rotated, scaled image data at procedure 508 produces a second scaled image data having a predetermined (a higher or a lower) resolution and size in the slow-scan or the process direction. The resolution and size of the second scaled image data (i.e., obtained at procedure 508) in the fast-scan or the cross-process direction remains the unchanged during the procedure 508.

The method 500 ends at procedure 510, where the binary output image data is sent/output to the output device 206 (as shown in and explained with respect to FIG. 2).

The procedures 102-114 that are performed during the procedures 504 and 508 of the method 500 are shown and described in detail with respect to FIG. 1, and hence will not be explained in detail here. As noted above, in one embodiment, the procedures 102-114 can be performed by one or more computer program modules that can be executed by one or more processors 204 (as shown in and explained with respect to FIG. 2).

Figure 6:
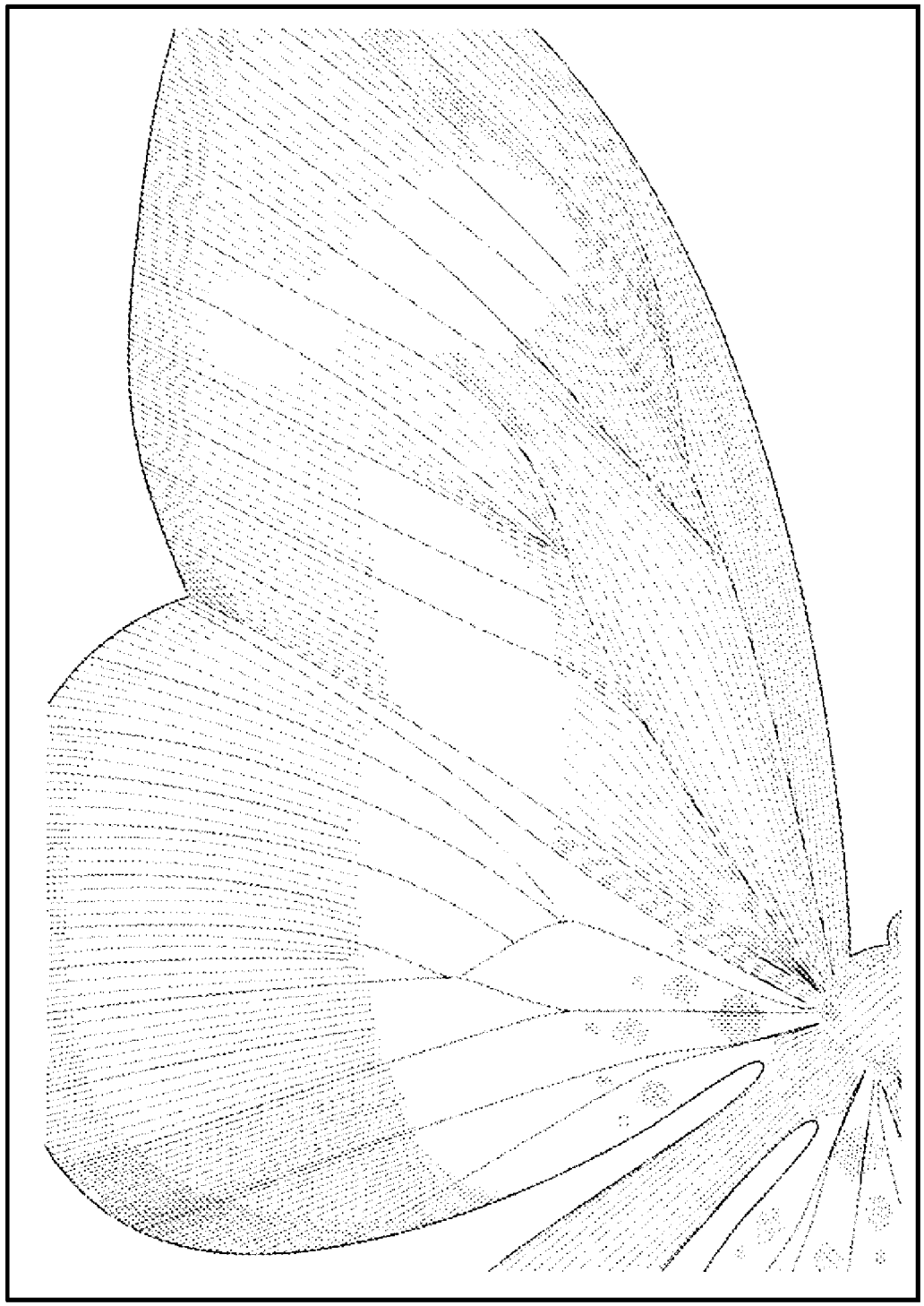
FIG. 6 illustrates an exemplary input image data.

FIG. 6 illustrates an exemplary binary input image data. The exemplary binary input image data shown in FIG. 6 has a resolution of 400×400 dpi, and a pixel depth resolution of 1 bpp. In other words, the binary input image data shown in FIG. 6 has a resolution of 400 dpi in the fast-scan/cross-process direction, and a resolution of 400 dpi in the slow-scan/process direction.

Figure 7:
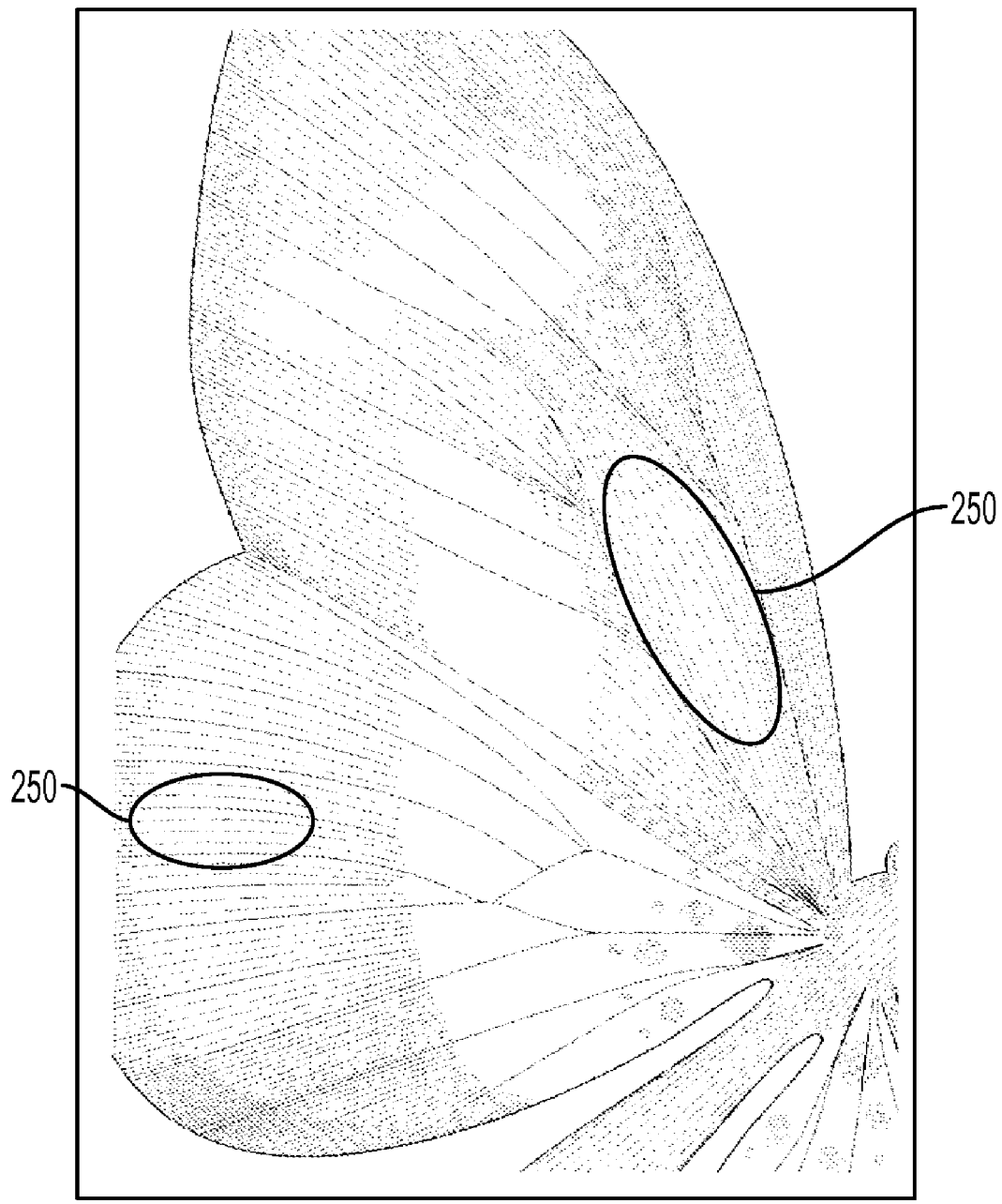
FIG. 7 illustrates an exemplary output image data obtained by performing image reduction on the input image data, shown in FIG. 6, in accordance with a prior art scaling method.

FIG. 7 illustrates an exemplary output image data obtained by performing image reduction on the input image data, shown in FIG. 6, in accordance with a prior art scaling method. The exemplary output input image data shown in FIG. 7 has a resolution of 225×400 dpi, and a pixel depth resolution of 1 bpp. In other words, when the image reduction is performed using the prior art scaling method, the resolution in the fast-scan/cross-process direction changed from 400 dpi to 225 dpi, while the resolution in the slow-scan/process direction remained unchanged at 400 dpi.

The prior art scaling method (e.g., nearest neighbor algorithm) performs the image reduction by dropping lines of the image. For example, the prior art scaling method may use every other line of a window of interest. Dropping lines, however, introduces a number of image quality defects 250 (as shown in FIG. 7) into the image, especially in areas containing thin lines and small text. Dropping lines also decreases image quality because the information in every pixel that contributes to the scaled image is thrown away to meet the resolution requirements.

Figure 8:
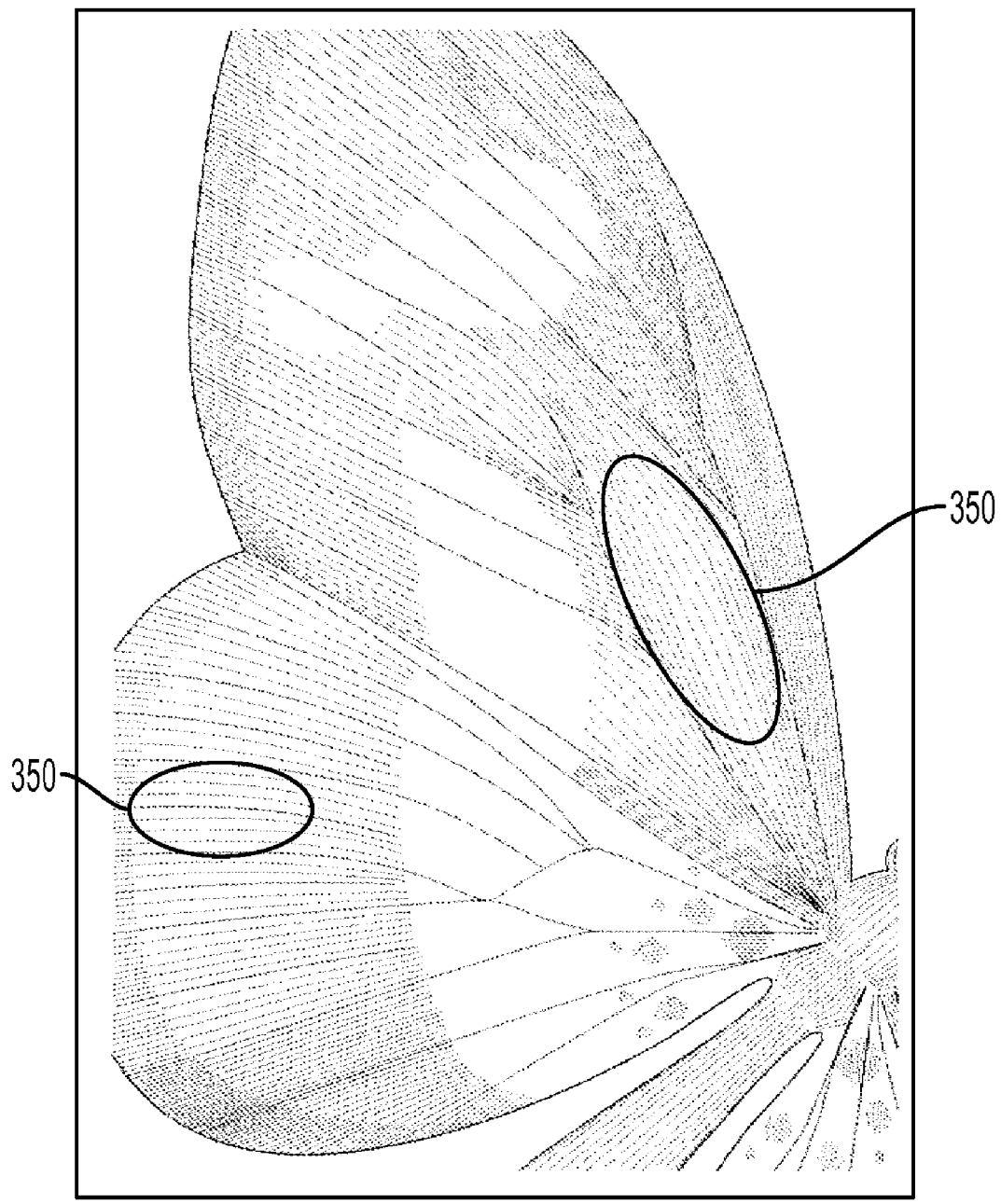
FIG. 8 illustrates an exemplary output image data obtained by performing image reduction on the input image data, shown in FIG. 6, in accordance with an embodiment of the present disclosure.

FIG. 8 illustrates an exemplary output image data obtained by performing image reduction on the input image data, shown in FIG. 6, in accordance with an embodiment of the present disclosure. The exemplary output input image data shown in FIG. 8 has a resolution of 225×400 dpi, and a pixel depth resolution of 1 bpp. In other words, when the image reduction is performed using the method 100, the resolution in the fast-scan/cross-process direction changed from 400 dpi to 225 dpi, while the resolution in the slow-scan/process direction remained unchanged at 400 dpi. As shown by exemplary regions 350 of FIG. 8, the method 100 and the system

200 preserve the dot-pattern structure (i.e., obtained from the previous rendering operation) as well as small text and line art in the scaled image.

Figure 9:
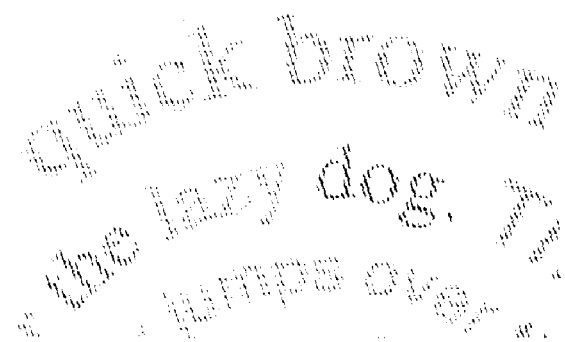
FIG. 9 illustrates another exemplary input image data.

FIG. 9 illustrates another exemplary binary input image data. The exemplary binary input image data shown in FIG. 9 has a resolution of 400×400 dpi, and a pixel depth resolution of 1 bpp. In other words, the binary input image data shown in FIG. 9 has a resolution of 400 dpi in the fast-scan/cross-process direction, and a resolution of 400 dpi in the slow-scan/process direction.

Figure 10:
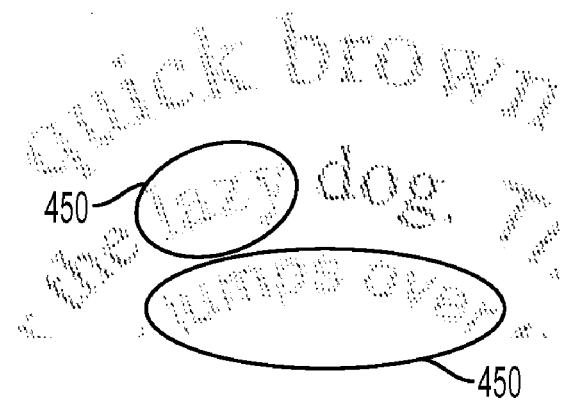
FIG. 10 illustrates an exemplary output image data obtained by performing image reduction on the input image data, shown in FIG. 9, in accordance with a prior art scaling method.

FIG. 10 illustrates an exemplary output image data obtained by performing image reduction on the input image data, shown in FIG. 9, in accordance with a prior art scaling method. The exemplary output input image data shown in FIG. 10 has a resolution of 225×400 dpi, and a pixel depth resolution of 1 bpp. In other words, when the image reduction is performed using the prior art scaling method, the resolution in the fast-scan/cross-process direction changed from 400 dpi to 225 dpi, while the resolution in the slow-scan/process direction remained unchanged at 400 dpi.

The prior art scaling method (e.g., nearest neighbor algorithm) performs the image reduction by dropping lines of the image. For example, the prior art scaling method may use every other line of a window of interest. Dropping lines, however, introduces a number of image quality defects 450 (as shown in FIG. 10) into the image, especially in areas containing thin lines and small text. Dropping lines also decreases image quality because the information in every pixel that contributes to the scaled image is thrown away to meet the resolution requirements.

Figure 11:
FIG. 11 illustrates an exemplary output image data obtained by performing image reduction on the input image data, shown in FIG. 9, in accordance with an embodiment of the present disclosure.

FIG. 11 illustrates an exemplary output image data obtained by performing image reduction on the input image data, shown in FIG. 9, in accordance with an embodiment of the present disclosure. The exemplary output input image data shown in FIG. 11 has a resolution of 225×400 dpi, and a pixel depth resolution of 1 bpp. In other words, when the image reduction is performed using the method 100, the resolution in the fast-scan/cross-process direction changed from 400 dpi to 225 dpi, while the resolution in the slow-scan/process direction remained unchanged at 400 dpi. As shown by exemplary regions 550 of FIG. 11, the method 100 and the system 200 preserve the dot-pattern structure (i.e., obtained from the previous rendering operation) as well as small text and line art in the scaled image.

Figure 12:
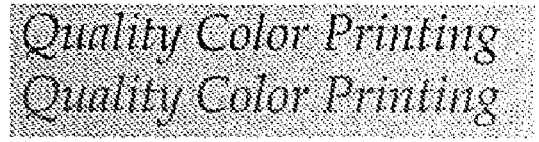
FIG. 12 illustrates yet another exemplary input image data.

FIG. 12 illustrates yet another exemplary binary input image data. The exemplary binary input image data shown in FIG. 12 has a resolution of 400×400 dpi, and a pixel depth resolution of 1 bpp. In other words, the binary input image data shown in FIG. 12 has a resolution of 400 dpi in the fast-scan/cross-process direction, and a resolution of 400 dpi in the slow-scan/process direction.

FIGS. 13-17 illustrate exemplary output image data obtained by performing image reduction on the input image data, shown in FIG. 12, in accordance with an embodiment of the present disclosure. Specifically, FIGS. 13-17 illustrate how density of the output image data may be adjusted by varying certain parameters, for example, the threshold value, thresh described and shown in Equation (4), the density parameter, dfactor described and shown in the Equation (5), and the error amortization factor, eafactor described and shown in the Equation (5).

The exemplary output input image data shown in FIGS. 13-17 have a resolution of 225×400 dpi, and a pixel depth resolution of 1 bpp. In other words, when the image reduction is performed using the method 100, the resolution in the fast-scan/cross-process direction changed from 400 dpi to 225 dpi, while the resolution in the slow-scan/process direction remained unchanged at 400 dpi.

Figure 13:
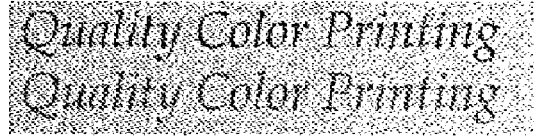
FIGS. 13-17 illustrate exemplary output image data obtained by performing image reduction on the input image data, shown in FIG. 12, in accordance with an embodiment of the present disclosure, specifically.
Figure 14:
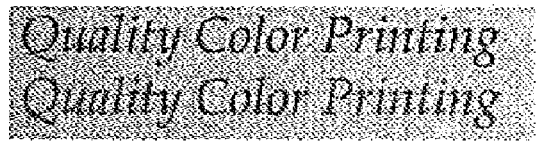

FIGS. 13 and 14 illustrate a comparison of the output density of two output images (obtained using the method 100) when the threshold value, thresh is reduced from 0.9 to 0.5, while the density parameter, dfactor remained unchanged at 2.0, the output resolution remained unchanged at 225×400 dpi, and the error amortization factor, eafactor remained unchanged at 2.0. When the threshold value, thresh is reduced, the output image (as shown in FIG. 14) is darker and includes more pixels in comparison with the output image as shown in FIG. 13.

Figure 15:
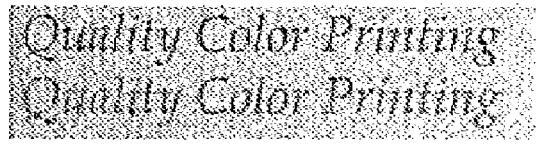

FIGS. 14 and 15 illustrate a comparison of the output density of two output images (obtained using the method 100) when the error amortization factor, eafactor is reduced from 2.0 to 1.0, while the density parameter, dfactor remained unchanged at 2.0, the output resolution remained unchanged at 225×400 dpi, and the threshold value, thresh remained unchanged at 0.5. By reducing the error amortization factor, eafactor, more error can be propagated to the next pixel.

Figure 16:
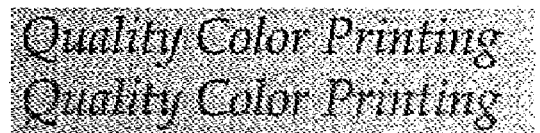

FIGS. 15 and 16 illustrate a comparison of the output density of two output images (obtained using the method 100) when the threshold value, thresh is increased from 0.5 to 0.9, and the density parameter, dfactor is reduced from 2.0 to 1.5, while the output resolution remained unchanged at 225×400 dpi, and the error amortization factor, eafactor remained unchanged at 1.0.

Figure 17:
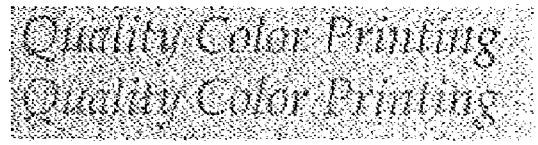

FIGS. 16 and 17 illustrate a comparison of the output density of two output images (obtained using the method 100) when the error amortization factor, eafactor is increased from 1.0 to 3.0, while the density parameter, dfactor remained unchanged at 1.5, the output resolution remained unchanged at 225×400 dpi, and the threshold value, thresh remained unchanged at 0.9.

These three parameters (i.e., thresh, eafactor, and dfactor) may be changed to vary the density of the output dot structure so that the density of the output dot structure may either match the density of the input image or be equal to a predetermined density (e.g., a higher density) that improves the image quality of the output/scaled image. Thus, FIGS. 13-17 illustrate how a wide variety of densities may be obtained, for the same output resolution, by simply adjusting these three parameters.

The methods 100, 500 and the system 200 perform the scaling and the error propagation in a binary domain, thus, preserving the fractional (non-integer) component of the intermediate pixel and propagating the error more accurately. The methods 100, 500 and the system 200 also provide various factors (e.g., the threshold value, thresh, the density parameter, dfactor and the error amortization factor, eafactor) that can be adjusted to control the error propagated to the adjacent pixel, thus, adjusting the density of the output image.

In one embodiment, the scaling algorithm of the present invention is configured to work on a single one bit channel at a time. The scaling algorithm of the present invention may not have any knowledge of the color space that the channel (the scaling algorithm is processing) belongs to. For example, in one embodiment, when inputs are in RGB (from a scanner as an example) and outputs are in CMYK (i.e., the color separations between RGB and CMYK do not match up and need to be translated from one to the other), then RGB to CMYK transformation is performed upstream of the binary scaling operation, and then each CMYK channel is sent through the processor of the present invention to perform the binary scaling operation.

Embodiments of the present disclosure, the processor, for example, may be made in hardware, firmware, software, or various combinations thereof. The present disclosure may also be implemented as instructions stored on a machine-readable medium, which may be read and executed using one or more processors. In one embodiment, the machine-readable medium may include various mechanisms for storing and/or transmitting information in a form that may be read by a machine (e.g., a computing device). For example, a machine-readable storage medium may include read only memory, random access memory, magnetic disk storage media, optical storage media, flash memory devices, and other media for storing information, and a machine-readable transmission media may include forms of propagated signals, including carrier waves, infrared signals, digital signals, and other media for transmitting information. While firmware, software, routines, or instructions may be described in the above disclosure in terms of specific exemplary aspects and embodiments performing certain actions, it will be apparent that such descriptions are merely for the sake of convenience and that such actions in fact result from computing devices, processing devices, processors, controllers, or other devices or machines executing the firmware, software, routines, or instructions.

While the present disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the present disclosure following, in general, the principles of the present disclosure and including such departures from the present disclosure as come within known or customary practice in the art to which the present disclosure pertains, and as may be applied to the essential features hereinbefore set forth and followed in the spirit and scope of the appended claims.

What is claimed is:

1. A computer-implemented method for performing binary image reduction on binary image data, wherein the method is implemented in a computer system comprising one or more processors configured to execute one or more computer program modules, the method comprising:
   receiving binary input image data, the input image data comprising a plurality of input pixels, an input resolution, and an input size;
   determining a conversion factor to scale
      (i) the input resolution to an output resolution;
      (ii) the input size to an output size; or
      (iii) the input resolution to the output resolution and the input size to the output size;
   applying the conversion factor to the input image data to obtain intermediate data, wherein each intermediate data corresponds to at least one input pixel and at least a portion of another input pixel;
   obtaining a binary output image data comprising a plurality of output pixels by thresholding the corresponding intermediate data;
   determining an error value for each output pixel, the error value is a non-integer value obtained as a result of thresholding the intermediate data corresponding to the output pixel; and
   propagating the obtained error value to an adjacent output pixel in a scanline;
   wherein the output image data is scaled to the output resolution and/or the output size.

2. The method of claim 1, wherein the error value is determined using the following equation:

error value=(intermediate data value−output pixel value×density parameter)/error amortization factor.

3. The method of claim 2, wherein the error amortization factor is configured to control the amount of error accumulated in the error value.

4. The method of claim 2, wherein the density parameter and the error amortization factor are configured to adjust density of the output image data.

5. The method of claim 1, wherein the intermediate data is thresholded using a threshold value, the threshold value is configured to adjust density of the output image data.

6. The method of claim 1, further comprising sending the output image data to an output device.

7. The method of claim 1, wherein the conversion factor is determined by calculating (i) a ratio of the input resolution to the output resolution, (ii) a ratio of the input size to the output size, or (iii) a ratio of the input resolution to the output resolution and a ratio of the input size to the output size.

8. The method of claim 1, wherein the binary output image data is scaled to the output resolution in a cross-process direction.

9. The method of claim 8, wherein the binary output image data is scaled to the output resolution in a process direction by rotating the binary input image data by 90 degrees, and performing binary image reduction on the rotated input image data.

10. A system for performing binary image reduction on binary image data, the system comprising:
    an input device is configured to receive binary input image data, the input image data comprising a plurality of input pixels, an input resolution, and an input size;
    a processor configured to:
       a) determine a conversion factor to scale
          (i) the input resolution to an output resolution;
          (ii) the input size to an output size; or
          (iii) the input resolution to the output resolution and the input size to the output size;
       b) apply the conversion factor to the input image data to obtain intermediate data, wherein each intermediate data corresponds to at least one input pixel and at least a portion of another input pixel;
       c) obtain a binary output image data comprising a plurality of output pixels by thresholding the corresponding intermediate data;
       d) determine an error value for each output pixel, the error value is a non-integer value obtained as a result of thresholding the intermediate data corresponding to the output pixel; and
       e) propagate the obtained error value to an adjacent output pixel in a scanline; and
    an output device is configured to output the binary output image data scaled to the output resolution or the output size.

11. The system of claim 10, wherein the error value is determined using the following equation:

error value=(intermediate data value−output pixel value×density parameter)/error amortization factor.

12. The system of claim 11, wherein the error amortization factor is configured to control the amount of error accumulated in the error value.

13. The system of claim 11, wherein the density parameter and the error amortization factor are configured to adjust density of the output image data.

14. The system of claim 10, wherein the intermediate data is thresholded using a threshold value, the threshold value is configured to adjust density of the output image data.

15. The system of claim 10, wherein the conversion factor is determined by calculating (i) a ratio of the input resolution to the output resolution, (ii) a ratio of the input size to the output size, or (iii) a ratio of the input resolution to the output resolution and a ratio of the input size to the output size.

16. The system of claim 10, wherein the binary output image data is scaled to the output resolution in a cross-process direction.

17. The system of claim 16, wherein the binary output image data is scaled to the output resolution in a process direction by rotating the binary input image data by 90 degrees, and performing binary image reduction on the rotated input image data.

18. The system of claim 10, wherein the output device is an image printing system, or a display.

* * * * *